United States Patent [19]

Nakagawa et al.

[11] Patent Number: 5,109,491
[45] Date of Patent: Apr. 28, 1992

[54] MEMORY MANAGEMENT DEVICE

[75] Inventors: Norio Nakagawa, Kodaira; Katsuaki Takagi, Higashimurayama, both of Japan

[73] Assignee: Hitachi, Ltd., Tokyo, Japan

[21] Appl. No.: 525,550

[22] Filed: May 18, 1990

Related U.S. Application Data

[63] Continuation of Ser. No. 136,138, Dec. 21, 1987, abandoned.

[30] Foreign Application Priority Data

Dec. 26, 1986 [JP] Japan ................. 61-308446

[51] Int. Cl.⁵ .......................................... G06F 13/36
[52] U.S. Cl. ................................. 395/325; 364/242.6; 364/242.92; 364/242.3
[58] Field of Search ... 364/200 MS File, 900 MS File

[56] References Cited

U.S. PATENT DOCUMENTS

| | | | |
|---|---|---|---|
| 4,215,400 | 7/1980 | Denko | 364/200 |
| 4,245,307 | 1/1981 | Kapeghian et al. | 364/200 |
| 4,417,304 | 11/1983 | Dinwiddie, Jr. | 364/200 |
| 4,458,313 | 7/1984 | Suzuki et al. | 364/200 |
| 4,535,330 | 8/1985 | Carey et al. | 340/825.5 |
| 4,558,412 | 12/1985 | Inoshita et al. | 364/200 |
| 4,583,160 | 4/1986 | Iguma | 364/200 |
| 4,648,029 | 3/1987 | Cooper et al. | 364/200 |
| 4,669,043 | 5/1987 | Kaplinsky | 364/200 |
| 4,805,097 | 2/1989 | De Sanna | 364/200 |

OTHER PUBLICATIONS

Nikkei Electronics, Dec. 5, 1983, Nikkei McGraw-Hill Inc., pp. 146–150 (English translation enclosed).

Primary Examiner—Michael R. Fleming
Assistant Examiner—Debra A. Chun
Attorney, Agent, or Firm—Fay, Sharpe, Beall, Fagan, Minnich & McKee

[57] ABSTRACT

A memory management device which is connected in a virtual address space or a physical address space together with another device capable of becoming a bus master, is endowed with the function of detecting the bus request signal of the other device, interrupting an address translation process under execution and causing a processor to release a bus. Thus, the other device can be made the bus master without being kept waiting for a long time, and a system bug can be prevented which is attributed to such a fact that a wait time exceeds the data hold time of an input/output device connected to, for example, a direct memory access controller.

22 Claims, 4 Drawing Sheets

MEMORY MANAGEMENT DEVICE

This application is a continuation of U.S. patent application Ser. No. 136,138, filed Dec. 21, 1987, now abandoned.

BACKGROUND OF THE INVENTION

This invention relates to a memory management device. More particularly, it relates to a technique which is effective when utilized in, for example, a memory management unit or a cache controller that is connected to the system bus of a microcomputer system together with a direct memory access controller (DMA controller).

One expedient for removing restrictions attributable to the physical properties of a memory and forming a versatile program system is the virtual store system. In this virtual store system, there is a memory management unit by which a logical or virtual address delivered from a processor is translated into a physical address on the memory.

Such a memory management unit is stated in, for example, "NIKKEI ELECTRONICS" dated Dec. 5, 1983, issued by Nikkei McGraw-Hill Inc., pp. 146–150.

Figure 4:
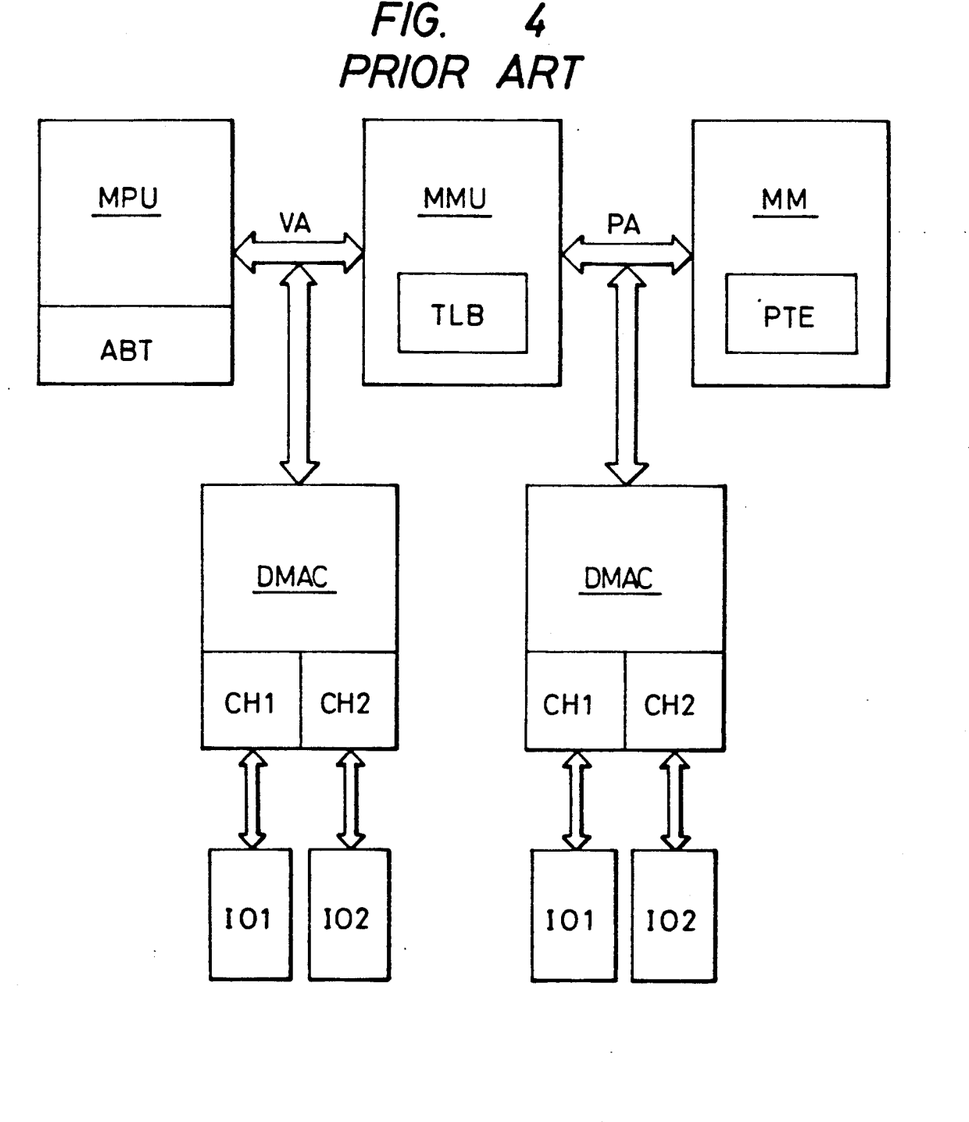
FIG. 4 is a connection diagram showing an example of a prior-art microcomputer system.

Shown in FIG. 4 is the storing loop of a microcomputer system which employs the virtual store system. Referring to the figure, a microprocessor unit MPU used as a processor is provided with a built-in bus arbiter ABT and has a bus control function The storing loop as viewed from the microprocessor unit MPU is arranged in a continuous virtual address space.

A memory management unit MMU has the function of translating a virtual address VA delivered from the microprocessor unit MPU, into a physical address PA corresponding to the memory area of a main memory MM. The memory area of the main memory MM is divided into pages with a predetermined size. The address translation by the memory management unit MMU is effected on the basis of a so-called paging system wherein, for example, the predetermined upper bits of the virtual address VA are translated into a page address (frame No.) on the physical address PA.

The upper bits of the virtual address VA and the page address on the physical address PA are held in correspondence by a page translation table PTE which is prepared in the main memory MM. The memory management unit MMU realizes the address translation process with reference to this page translation table PTE.

Meanwhile, as the processing ability of the system has been expanded to increase the storage capacity of the main memory MM, there has come into adoption a multi-level paging system wherein the page translation table PTE is stepped into a plurality of levels so as to perform paging processes at the plurality of levels, whereby a memory area to be used for the page translation table is saved. With this system, the number of times which the memory management unit MMU refers to the page translation table PTE enlarges, and the period of time which is required for the address translation process lengthens, so that the processing ability of the system degrades. In order to prevent this drawback, an address translation buffer TLB is employed within the memory management unit MMU.

More specifically, the results of the address translation processes executed by the memory management unit MMU are recorded in the address translation buffer TLB provided within the memory management unit MMU. The memory management unit MMU first refers to the address translation buffer TLB, thereby to try the address translation process. Only in a case where, as a result, a desired address is not recorded in the address translation buffer TLB, that is, the buffer is miss hit, the memory management unit MMU refers to the page translation table PTE within the main memory MM. The address translation buffer TLB is furnished with the required minimum number of entries at which the hit rate thereof reaches a predetermined value. Accordingly, the provision of the address translation buffer TLB raises the speed of the address translation processes of the memory management unit MMU and can suppress the degradation of the processing ability of the system attributed to the adoption of the virtual store system of the multilevel paging system.

The inventors' study, however, has revealed that a problem to be stated below is involved in a case where a direct memory access controller DMAC of low function not having a buffering function, etc., an input/output device having a direct memory access function, or the like is connected in the virtual address space or physical address space in FIG. 4. The input/output device which transfers a series of successive data items between it and the main memory MM or another device through the direct memory access controller DMAC has a data hold time which is permissible according to the operating speed of the input/output device. When the input/output of data has become necessary in the device, the direct memory access controller DMAC sends a bus request signal to the bus arbiter ABT of the microprocessor MPU. On this occasion, when the memory management unit MMU is executing the address translation process based on the page translation table PTE within the main memory MM because of the miss hit of the address translation buffer TLB, the memory access controller DMAC is kept waiting until the address translation process of the memory management unit MMU ends. When a wait time in this case exceeds the data hold time of the device, the various devices fall into error states, and a system bug arises.

SUMMARY OF THE INVENTION

An object of this invention is to provide a memory management device which prevents the system bug attributed to the occupancy of a bus for a long time It is another object of this invention to provide a bus arbitration method for memory management device that reduces system protocol. The invention solves the problems resulting from a plurality of devices contending for a system bus and in particular solves the problem by accessing the bus to the device that could lose data by a wait time in excess of the device data hold time.

The aforementioned and other objects and novel features of this invention will become apparent from the description of the specification and the accompanying drawings.

Typical aspects of performance of this invention are briefly summarized as follows: In a case where another device capable of becoming a bus master is connected in a virtual address space, a memory management device is endowed with the function of detecting the bus request signal of the above device and interrupting an address translation process under execution so as to cause a processor to release a bus and to grant the bus request of the above device Besides, in a case where another device capable of becoming a bus master is connected in a physical address space, a memory management device is endowed with a bus control function and functions to detect the bus request signal of the above device and interrupt an address translation process under execution so as to release a bus and to grant the bus request of the above device.

According to the expedients stated above, the bus request of high priority level which arises during the address translation process of the memory management device is granted subject to a wait of short time. It is therefore possible to prevent the system bug which is ascribable to, e.g., the wait time exceeding the data hold time of the input/output device.

DESCRIPTION OF THE PREFERRED EMBODIMENTS

Figure 1:
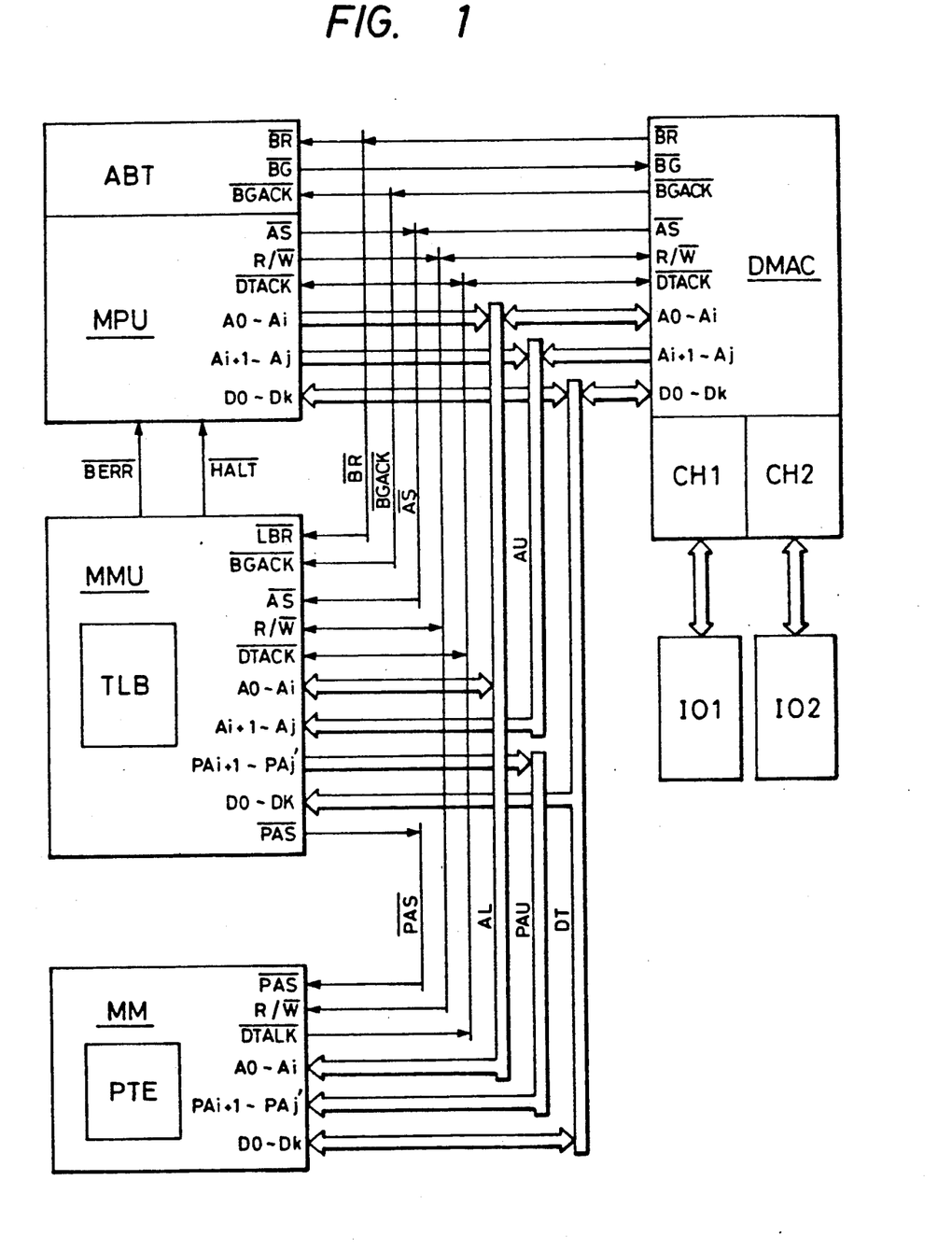
FIG. 1 is a connection diagram showing an embodiment of a microcomputer system including a memory management device to which this invention is applied.

Shown in FIG. 1 is a connection diagram of an embodiment of a microcomputer system including a memory management unit MMU to which this invention is applied. In this embodiment, a direct memory access controller DMAC capable of becoming a bus master is connected in a virtual address space. Although, in the figure, the direct memory access controller DMAC is implemented as a separate device, it may well be one circuit block of a device having a direct memory access function.

In this embodiment, a microprocessor unit MPU has a bus arbiter ABT built therein and has a bus control function However, the bus request signal $\overline{BR}$ of the direct memory access controller DMAC is input to the external terminal $\overline{LBR}$ of the memory management unit MMU, while the bus grant acknowledge signal $\overline{BGACK}$ thereof is input to the external terminal $\overline{BGACK}$ of the memory management unit MMU. The memory management unit MMU detects the bus request of the direct memory access controller DMAC in accordance with the bus request signal $\overline{BR}$. On this occasion, in a case where the bus grant acknowledge signal $\overline{BGACK}$ is not asserted (here, irrespective of signal levels, it shall be expressed as "asserted" that a signal is active or true, and the same applies hereinbelow), the memory management unit MMU interrupts an address translation process and releases a bus upon negating a physical address strobe signal $\overline{PAS}$, a halt signal $\overline{HALT}$ and a bus error signal $\overline{BERR}$ (here, irrespective of signal levels, it shall be expressed as "negated" that a signal is inactive or false, and the same applies hereinbelow). Thus, the microprocessor MPU sets the direct memory access controller DMAC as the bus master. After the process of the direct memory access controller DMAC has ended, the microprocessor MPU retries a process concerning the interrupted address translation.

In FIG. 1, address busses coupled to the microprocessor MPU are divided into a lower-bit address bus AL which transmits the address signals $A_0-A_i$ of lower $(i+1)$ bits, and an upper-bit address bus AU which transmits the address signals $A_{i+1}-A_j$ of upper (j-i) bits. These address busses AL and AU are both supplied with the virtual address signals from the microprocessor MPU or the direct memory access controller DMAC. Among them, the lower-bit virtual address signals which are transmitted by the lower-bit address bus AL are directly supplied to the memory management unit MMU and a main memory MM. On the other hand, the upper-bit virtual address signals which are transmitted by the upper-bit address bus AU are supplied to the memory management unit MMU and are translated into physical address signals. The upper-bit physical address signals $PA_{i+1}-PA_j'$ translated by the memory management unit MMU are sent to the main memory MM through an upper-bit physical address bus PAU.

The upper-bit virtual address signals which are transmitted through the upper-bit address bus AU are accepted by the memory management unit MMU in accordance with an address strobe signal $\overline{AS}$ which is supplied from the microprocessor MPU or the direct memory access controller DMAC. Besides, the upper-bit physical address signals which are transmitted through the upper-bit physical address bus PAU are accepted by the main memory MM in accordance with the physical address strobe signal $\overline{PAS}$ which is supplied from the memory management unit MMU. The lower-bit address signals which are transmitted through the lower-bit address bus AL are accepted by the memory management unit MMU in accordance with the address strobe signal $\overline{AS}$, and are accepted by the main memory MM in accordance with the physical address strobe signal $\overline{PAS}$. The memory management unit MMU does not require the lower-bit address signals $A_0-A_i$ in the ordinary address translation operation, but control data items for respective registers in the memory management unit MMU, for example, are sometimes input to or output from this unit through the lower-bit address bus AL.

Meanwhile, a data bus DT has the microprocessor MPU, direct memory access controller DMAC, memory management unit MMU and main memory MM coupled thereto This data bus DT is supplied with data items $D_0-D_k$ of $(k+1)$ bits from the microprocessor MPU, direct memory access controller DMAC or main memory MM at the same time as a data transfer acknowledge signal $\overline{DTACK}$. The moving direction of the data items $D_0-D_k$ which are transmitted through the data bus DT is determined by a read/write signal $R/\overline{W}$ which is sent from the microprocessor MPU, direct memory access controller DMAC or memory management unit MMU.

The bus arbiter ABT is built in the microprocessor MPU. This bus arbiter ABT has the bus request signal $\overline{BR}$ and the bus grant acknowledge signal $\overline{BGACK}$ sent thereto from the direct memory access controller DMAC. The bus request signal $\overline{BR}$ and the bus grant acknowledge signal $\overline{BGACK}$ are also sent to the memory management unit MMU. The direct memory access controller DMAC has a bus grant signal $\overline{BG}$ sent thereto from the microprocessor MPU. These signals consisting of the bus request signal $\overline{BR}$, bus grant signal $\overline{BG}$ and bus grant acknowledge signal $\overline{BGACK}$ are sometimes coupled to other bus masters, not shown, in wired-OR fashion.

The bus arbiter ABT of the microprocessor MPU detects the bus request of the direct memory access controller DMAC on the basis of the assertion of the bus request signal $\overline{BR}$. Then, it asserts the bus grant signal $\overline{BG}$ to inform the direct memory access controller DMAC of the fact that the controller can become the bus master at the time of the end of a bus cycle being presently executed. The direct memory access controller DMAC asserts the bus grant acknowledge signal $\overline{BGACK}$ and becomes the bus master under the condition that the bus grant acknowledge signal $\overline{BGACK}$, address strobe signal $\overline{AS}$ and data transfer acknowledge signal $\overline{DTACK}$ are all negated.

The direct memory access controller DMAC is a device of comparatively low function which does not have a buffering function, a retry function, etc. for coping with a case where a wait time has exceeded a data hold time. Though not especially restricted, the direct memory access controller DMAC has two channels CH1 and CH2. These channels CH1 and CH2 have corresponding input/output devices I01 and I02 connected thereto, respectively.

Though not especially restricted, respective registers built in the direct memory access controller DMAC have a transfer start address and a transfer end address sent from the microprocessor MPU thereto through the data bus DT. The direct memory access controller DMAC generates address signals from the transfer start address to the transfer end address in succession, and mediates the transfer of a series of data between the input/output device I01 or I02 and the main memory MM or any other device Thus, the series of data items are transmitted at high speed without the intervention of the microprocessor MPU.

Though not especially restricted, the memory management unit MMU has a built-in address translation buffer TLB which is constructed of an associative storage. As will be described later, the results of the latest address translations performed by the memory management unit MMU are recorded in the address translation buffer TLB to a predetermined number of entries.

Using as a tag the upper-bit virtual address signals which are supplied through the upper-bit address bus AU from the microprocessor MPU or the direct memory access controller DMAC, the memory management unit MMU associatively reads out the upper-bit physical address which is stored in the address translation buffer TLB. The corresponding upper-bit physical address signals are sent to the main memory MM through the upper-bit physical address bus PAU.

In a case where the physical address corresponding to the supplied virtual address is not stored in the address translation buffer TLB, namely, where the address translation buffer TLB is miss hit, the memory management unit MMU asserts the halt signal $\overline{HALT}$ and the bus error signal $\overline{BERR}$ to bring the microprocessor MPU into the halt state thereof and to cause it to release the bus. Then, the memory management unit MMU performs a paging process by reference to a page translation table PTE which is prepared in the main memory MM.

Figure 3:
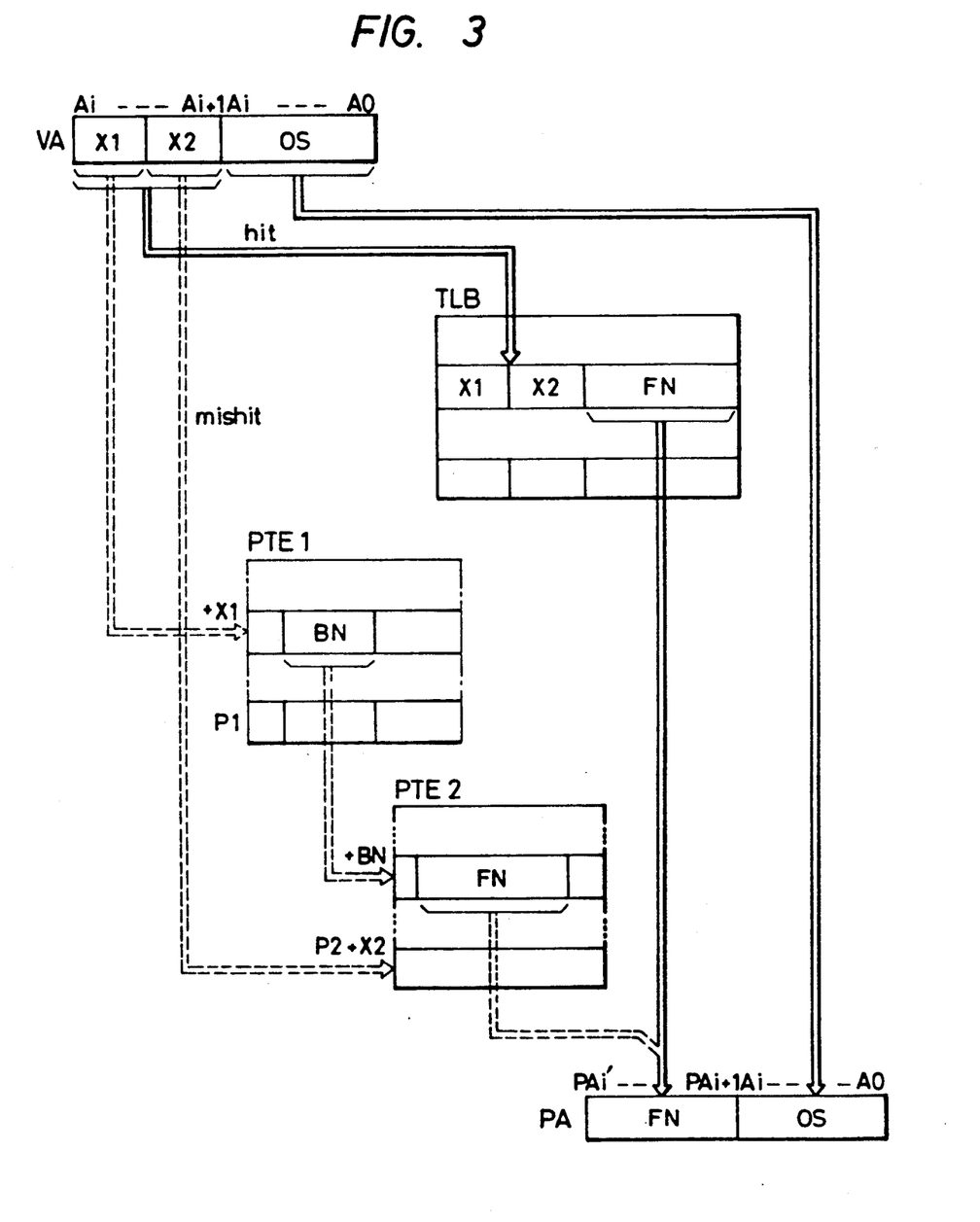
FIG. 3 is a flow diagram showing an embodiment of an address translation process in each of the memory management devices in FIGS. 1 and 2.

Shown in FIG. 3 is a flow diagram of the address translation process in the memory management unit MMU of this embodiment. The address translation process will be outlined with reference to the figure.

As stated before, the multi-paging system of two stages is adopted for the paging process in the memory management unit MMU of this embodiment though this aspect is not especially restrictive. Accordingly, the upper bits of virtual address signals VA are divided into two index parts X1 and X2 as indicated in FIG. 3. Besides, the page translation table PTE in the main memory MM is composed of two translation tables PTE1 and PTE2 which are provided in correspondence with the respective index parts X1 and X2. Of them, the first translation table PTE1 is arranged with the predetermined address P1 of the main memory MM set as its head address. In addition to control bits for memory protection, etc., block Nos. BN for qualifying the addresses of the translation table PTE2 are stored in the translation table PTE1. The address of the translation table PTE1 to be actually accessed is qualified by the first index part X1 of the virtual address signals VA into P1+X1. On the other hand, the second translation table PTE2 is arranged in a plurality of blocks with the predetermined address P2 of the main memory MM set as its head address. In addition to control bits for memory protection, etc., frame Nos. FN for use as the physical addresses of the upper bits are stored in the translation table PTE2. The block head address of the translation table PTE2 is qualified by the block No. BN read out from the translation table PTE1, and becomes P2+BN. The address in each block to be actually accessed is further modified by the second index part X2 of the virtual address signals VA into P2+BN+X2.

While executing address computations for accessing the translation tables PTE1 and PTE2, the memory management unit MMU accesses the page translation table PTE of the main memory MM twice and forms physical address signals. Here, the memory management unit MMU uses the frame No. FN read out of the translation table PTE2, as the upper-bit physical address signals $PA_{i+1}$-$PA_j'$. These upper-bit physical address signals, namely, the frame No. FN and the index parts X1 and X2 of given virtual address signals are stored in the address translation buffer TLB which is provided in the memory management unit MMU. These physical address signals are read out by the retry of the microprocessor MPU to proceed after the end of the address translation process of the memory management unit MMU, and are sent to the main memory MM through the upper-bit physical address bus PAU.

As shown in FIG. 3, the address translation buffer TLB provided in the memory management unit MMU is constructed of an associative memory having a plurality of entries, and it stores the index parts X1 and X2 of the virtual address signals VA and the frame Nos. FN for use as upper-bit physical addresses. This address translation buffer TLB is occasionally rewritten each time the address translation process of the memory management unit MMU ends. In the address translation buffer TLB, therefore, the frame Nos. of physical addresses accessed latest and the index parts of virtual addresses corresponding thereto are stored to the predetermined number of the entries at all times.

The memory management unit MMU uses the index parts X1 and X2 of the supplied virtual address signals VA as tags for reading out the address translation buffer TLB. The address translation buffer TLB instantly compares given tags, namely, the index parts X1 and X2 with the index parts stored in all the entries. In a case where both the compared index parts have agreed, that is, where the address translation buffer TLB has been hit, the frame No. FN of the pertinent entry is read out. The frame No. FN read out is output to the main memory MM as the upper-bit physical address signals $PA_{i+}$.

$_1$-PA$_j'$. These physical address signals are fed into the main memory MM in accordance with the physical address strobe signal $\overline{PAS}$ which is simultaneously output.

In contrast, in a case where any entry in which both the index parts agree does not exist, that is, where the address translation buffer TLB has been miss hit, the memory management unit MMU executes the paging process employing the page translation table PTE.

The address translation buffer TLB of the memory management unit MMU has the number of entries set so that the hit rate thereof may become, for example, about 95%. For this reason, the ordinary address translation process of the memory management unit MMU is sufficed merely by reading out the address translation buffer TLB and is carried out at high speed. However, in the case where the address translation buffer TLB has been miss hit, the address computations for accessing the first translation table PTE1 and the second translation table PTE2 and the accesses to the main memory MM must be repeatedly performed. Consequently, the address translation process of the memory management unit MMU requires a comparatively long time, and the bus is occupied by the memory management unit MMU meantime. Moreover, while the address translation process is executed by the memory management unit MMU, the halt signal $\overline{HALT}$ and the bus error signal $\overline{BERR}$ are kept asserted for the microprocessor MPU. This microprocessor MPU discerns the occupancy of the bus by the memory management unit MMU owing to the halt signal $\overline{HALT}$ and the bus error signal $\overline{BERR}$, and it starts the retry in accordance with the negations of these signals.

As stated before, the memory management unit MMU of this embodiment is supplied with the bus request signal $\overline{BR}$ and the bus grant acknowledge signal $\overline{BGACK}$ from another bus master which is connected in the virtual address space. In accordance with the assertion of the bus request signal $\overline{BR}$, the memory management unit MMU detects the bus request of, for example, the direct memory access controller DMAC, whereupon it interrupts the address translation process thereof and also negates the halt signal $\overline{HALT}$ and the bus error signal $\overline{BERR}$ for the microprocessor MPU. Thus, the microprocessor MPU intends to start the retry. Since, however, the bus request signal $\overline{BR}$ is asserted by the direct memory access controller DMAC, the microprocessor MPU grants the bus request preferentially. After the bus cycle of the direct memory access controller DMAC has ended, the microprocessor MPU retries a process concerning the address translation process miss hit before.

In a case where a plurality of direct memory access controllers DMAC are connected in the virtual address space, the memory management unit MMU monitors the bus grant acknowledge signal $\overline{BGACK}$ when the bus request of one direct memory access controller DMAC has been detected. On this occasion, in a case where the bus grant acknowledge signal $\overline{BGACK}$ is not asserted, the memory management unit MMU interrupts the address translation process as described above. However, in a case where the bus grant acknowledge signal $\overline{BGACK}$ is asserted by another direct memory access controller DMAC, the memory management unit MMU continues the address translation process upon regarding the bus request of this direct memory access controller DMAC as having already been granted.

As stated above, the memory management unit MMU of this embodiment is supplied with the bus request signal $\overline{BR}$ from the direct memory access controller DMAC. In accordance with this bus request signal $\overline{BR}$, the memory management unit MMU detects the bus request of the direct memory access controller DMAC. Further, under the condition that the bus grant acknowledge signal $\overline{BGACK}$ is not asserted, the memory management unit MMU interrupts the address translation process and also negates the halt signal $\overline{HALT}$ and the bus error signal $\overline{BERR}$, thereby causing the microprocessor MPU to grant the bus request of the direct memory access controller DMAC and to retry a process concerning the above address translation process. Therefore, the bus master such as the direct memory access controller DMAC is not kept waiting for a long time even when the address translation buffer. TLB of the memory management unit MMU has been miss hit, and there is eliminated the system bug attributed to the fact that the wait time exceeds the data hold time.

Figure 2:
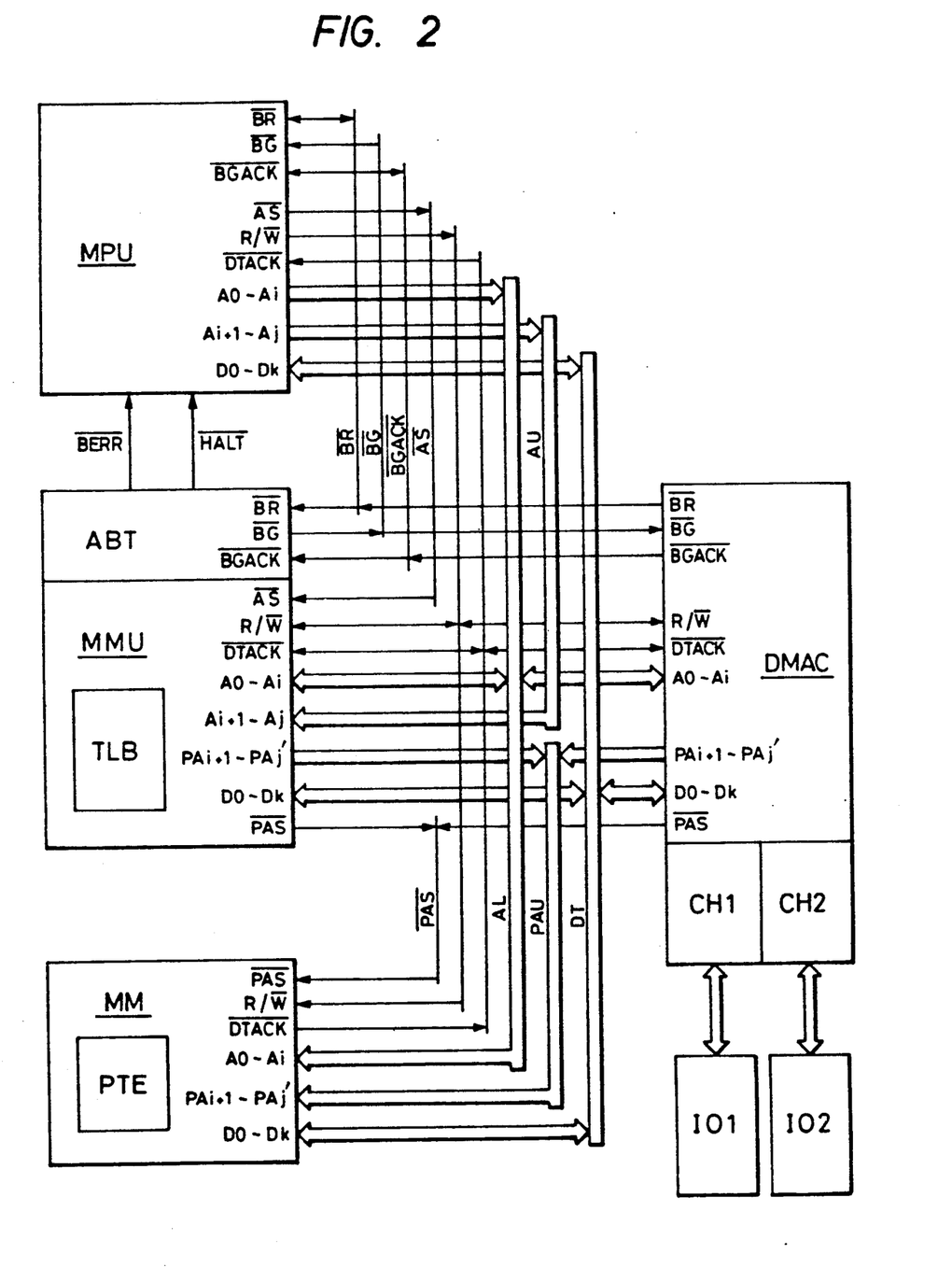
FIG. 2 is a connection diagram showing another embodiment of a microcomputer system to which this invention is applied.

Shown in FIG. 2 is a connection diagram of another embodiment of a microcomputer system including a memory management unit MMU to which this invention is applied. In this embodiment, a direct memory access controller DMAC is connected in the physical address space of the system. In the ensuing description, portions not particularly enumerated are the same as in the case of the first embodiment in FIG. 1.

In this embodiment, the memory management unit MMU has a bus arbiter ABT built therein and has a bus control function. Though no special restriction is intended, a microprocessor unit MPU similarly has a built-in bus arbiter ABT, and the bus arbiter ABT of the memory management unit MMU performs a bus control in this embodiment. Only the microprocessor MPU is connected in the virtual address space of the system, and this microprocessor MPU discerns that the memory management unit MMU is occupying a bus in the physical address space, owing to the assertions of a halt signal $\overline{HALT}$ and a bus error signal $\overline{BERR}$. Besides, the microprocessor MPU discerns that the direct memory access controller DMAC is occupying the bus in the physical address space, owing to the assertion of a bus grant acknowledge signal $\overline{BGACK}$. In a case where another bus master is connected in the virtual address space of the system, the bus control of the virtual address space by the memory management unit MMU is performed using a bus request signal $\overline{BR}$, a bus grant signal $\overline{BG}$ and the bus grant acknowledge signal $\overline{BGACK}$. The bus control by the bus arbiter ABT of the memory management unit MMU is performed in parallel with the address translation process of this memory management unit.

The memory management unit MMU executes the address translation process similar to that of the memory management unit MMU of the first embodiment. When an address translation buffer TLB is miss hit, the memory management unit MMU asserts the halt signal $\overline{HALT}$ and the bus error signal $\overline{BERR}$ thereby causing the microprocessor MPU to release the bus, while it performs a multilevel paging process referring to a page translation table PTE within a main memory MM. When the memory management unit MMU detects a bus request from the direct memory access controller DMAC during this paging process, it interrupts the address translation process and negates a physical address strobe signal $\overline{PAS}$ to release the bus under the condition that the bus grant acknowledge signal $\overline{\text{BGACK}}$ is not asserted Further, it grants the bus request of the direct memory access controller DMAC and sets this direct memory access controller DMAC as a bus master in accordance with a predetermined bus control procedure. Thus, the direct memory access controller DMAC is prevented from being caused to wait for a long time during the execution of the address translation process of the memory management unit MMU, and there is eliminated the system bug attributed to the fact that the wait time of the direct memory access controller DMAC exceeds the data hold time.

In FIG. 2, the bus arbiter ABT of the memory management unit MMU is supplied with the bus request signal $\overline{\text{BR}}$ and the bus grant acknowledge signal $\overline{\text{BGACK}}$ from the direct memory access controller DMAC. This bus grant acknowledge signal $\overline{\text{BGACK}}$ is also supplied to the microprocessor MPU. On the other hand, the bus grant signal $\overline{\text{BG}}$ is supplied from the memory management unit MMU to the direct memory access controller DMAC. The memory management unit MMU discerns the occupancy of the bus by the microprocessor MPU, owing to the fact that an address strobe signal $\overline{\text{AS}}$ is asserted In addition, the microprocessor MPU discerns the occupancy of the bus by the memory management unit MMU, owing to the halt signal $\overline{\text{HALT}}$ and the bus error signal $\overline{\text{BERR}}$, and it discerns the occupancy of the bus by another device, owing to the bus grant acknowledge signal $\overline{\text{BGACK}}$. The bus acquiring priority level of the microprocessor MPU as well as the memory management unit MMU is set lower than that of the other device capable of becoming the bus master.

The microprocessor MPU, memory management unit MMU, direct memory access controller DMAC and main memory MM are connected to a lower-bit address bus AL. Besides, the microprocessor MPU and memory management unit MMU are connected to an upper-bit address bus AU. The virtual address signals of upper bits for the memory management unit MMU are transmitted from the microprocessor MPU to this upper-bit address bus AU in accordance with the address strobe signal $\overline{\text{AS}}$. The memory management unit MMU, direct memory access controller DMAC and main memory MM are connected to an upper-bit physical address bus PAU. The physical address signals of upper bits for the main memory MM are transmitted from the memory management unit MMU or the direct memory access controller DMAC to this upper-bit physical address bus PAU in accordance with the physical address strobe signal $\overline{\text{PAS}}$.

The upper-bit virtual address signals sent from the microprocessor MPU to the memory management unit MMU are translated into the upper-bit physical address signals in such a way that the memory management unit MMU refers to the address translation buffer TLB. In a case where a physical address corresponding to the virtual address signals supplied to the memory management unit MMU is stored in the address translation buffer TLB, that is, where the address translation buffer TLB has been hit, the upper-bit physical address signals read out of the address translation buffer TLB are sent to the main memory MM through the upper-bit physical address bus PAU in the same bus cycle. The main memory MM accepts the upper-bit physical address signals in accordance with the physical address strobe signal $\overline{\text{PAS}}$ which is simultaneously output from the memory management unit MMU.

In contrast, in a case where the physical address corresponding to the supplied virtual address signals is not stored in the address translation buffer TLB of the memory management unit MMU, that is, where the address translation buffer TLB has been miss hit, the halt signal $\overline{\text{HALT}}$ and bus error signal $\overline{\text{BERR}}$ for the microprocessor MPU are asserted. Thus, the microprocessor MPU releases the bus, and the memory management unit MMU starts the paging process referring to the page translation table PTE of the main memory MM. The microprocessor MPU retries a process concerning the above address translation process at the point of time at which the memory management unit MMU has ended the paging process thereof to negate the halt signal $\overline{\text{HALT}}$ and bus error signal $\overline{\text{BERR}}$.

The method of the paging process which is carried out upon the miss hit of the address translation buffer TLB in the memory management unit MMU, is the same as in the case of the first embodiment stated before. In a case where, during the execution of the address translation process by the memory management unit MMU, the direct memory access controller DMAC has asserted the bus request signal $\overline{\text{BR}}$ to make a bus request, the bus request is detected by the bus arbiter ABT built in the memory management unit MMU. On this occasion, the memory management unit MMU asserts the bus grant signal $\overline{\text{BG}}$ in a case where the address strobe signal $\overline{\text{AS}}$ and the bus grant acknowledge signal $\overline{\text{BGACK}}$ are negated, so the microprocessor MPU, other direct memory access controllers DMAC, etc. do not occupy the bus, and where the memory management unit MMU itself does not occupy the bus, either. Thus, the direct memory access controller DMAC having made the bus request asserts the bus grant acknowledge signal $\overline{\text{BGACK}}$, and becomes the bus master. On the other hand, in a case where, at the detection of the bus request of the direct memory access controller DMAC, the microprocessor MPU is occupying the bus with the address strobe signal $\overline{\text{AS}}$ asserted, the memory management unit MMU asserts the halt signal $\overline{\text{HALT}}$ and bus error signal $\overline{\text{BERR}}$ for the microprocessor MPU. Thus, the microprocessor MPU interrupts a process under execution and releases the bus. The microprocessor MPU retries the interrupted process at the point of time at which the direct memory access controller DMAC as the bus master has ended its process. However, the memory management unit MMU continues the address translation process under execution in a case where, at the detection of the bus request of the direct memory access controller DMAC, the bus request of any other direct memory access controller DMAC has already been granted with the bus grant acknowledge signal $\overline{\text{BGACK}}$ asserted.

As described above, the memory management unit MMU of this embodiment is provided with the bus arbiter ABT so as to have the bus control function Moreover, in the case where the direct memory access controller DMAC has asserted the bus request signal $\overline{\text{BR}}$ during the execution of the address translation process by the memory management unit MMU, the bus arbiter ABT of the memory management unit MMU detects the bus request. On this occasion, under the condition that the bus grant acknowledge signal $\overline{\text{BGACK}}$ is not asserted, the memory management unit MMU releases the bus and grants the bus request of the direct memory access controller DMAC Thus, the direct memory access controller DMAC can become the bus master without being caused to wait for a long time. Accordingly, there is eliminated the system bug attributed to the fact that the wait time of the direct memory access controller DMAC exceeds the data hold time of an input/output device.

As clarified by the foregoing embodiments, in case of applying this invention to a memory management device which is connected to the system bus of a microcomputer system together with another device capable of becoming a bus master, such as a direct memory access controller, the following effects are produced:

(1) A memory management device which is connected in a virtual address space together with another device capable of becoming a bus master is endowed with the function of detecting the bus request signal of the other device, interrupting an address translation process under execution and causing a processor to release a bus, thereby to attain the effect that the other device can be made the bus master without being kept waiting for a long time.

(2) A memory management device which is connected in a physical address space together with another device capable of becoming a bus master is endowed with a bus control function and functions to detect the bus request signal cf the other device and interrupt an address translation process under execution so as to release a bus and grant the bus request of the other device, thereby to attain the effect that the other device can be made the bus master without being kept waiting for a long time.

(3) Owing to the aforementioned items (1) and (2), there is attained the effect that a bus request of higher priority level which arises during the execution of the address translation process by the memory management device can be granted in a short wait time, to prevent a system bug attributed to a wait time which exceeds the data hold time of an input/output device connected to, for example, a direct memory access controller.

(4) Owing to the aforementioned items (1)-(3), there is attained the effect that the direct memory access controller can be simplified in arrangement and lowered in cost.

(5) Owing to the aforementioned items (1)-(4), there is attained the effect that a microcomputer system which includes the memory management device and a plurality of devices capable of becoming bus masters can be improved in throughput and enhanced in reliability.

While, in the above, the invention made by the inventors has been specifically described on the basis of embodiments, it is needless to say that this invention is not restricted to the foregoing embodiments, but that it can be variously altered within a scope not departing from the purport thereof By way of example, although in the first and second embodiments, the direct memory access controller DMAC, etc. capable of becoming bus masters are connected in either the virtual address space or the physical address space, the direct memory access controller DMAC, etc may well be connected in both the virtual address space and the physical address space Besides, although the multilevel paging system based on two stages is adopted in the embodiments, a multilevel paging system of three or more stages may well be adopted. In the first embodiment, the bus arbiter ABT may well be disposed outside the microprocessor MPU, and the direct memory access controller DMAC may well be built in an input/output device. In this embodiment, the microprocessor MPU is caused to interrupt its process and to release the bus by asserting the halt signal $\overline{HALT}$ and the bus error signal $\overline{BERR}$, and it thereafter retries the process. However, the laying and combination of signal lines therefor are not especially limited by this embodiment. Further, this invention can adopt various aspects of performance including other practicable laying and combinations of system buses or other paging systems in the memory management unit MMU. Yet further, the memory management unit MMU may well be provided inside the microprocessor MPU.

While, in the above, the invention made by the inventors has been principally described as to cases where it is applied to the memory management devices of microcomputer systems forming the background field of utilization thereof, this invention is not restricted thereto but is also applicable to memory management devices for, e g., other digital systems. This invention is applicable to, at least, a memory management device which is connected to system buses together with another device capable of becoming a bus master or to a system which includes such a memory management device.

What is claimed is:

1. A method of bus arbitration for handling data transfer requests in a computer system including a microprocessor which provides virtual addresses, a memory management unit coupled to said microprocessor for translating the virtual addresses to physical addresses, a main memory which is coupled to said memory management unit via an address bus and which receives the physical addresses and a plurality of devices coupled to said memory management unit via said address bus, wherein the memory management unit and each of said plurality of devices may selectively perform a bus master function and wherein a predetermined device of said plurality of devices has a data hold time less than a time for occupying a bus in translating a one of the virtual addresses by the memory management unit to a corresponding physical address, the method comprising the steps of:

occupying the bus with an address translation process wherein the memory management unit performs the bus master function;

detecting a bus request by the predetermined device;

interrupting the address translation process;

releasing the bus from said memory management unit to the predetermined device so that a loss of data in the predetermined device which may occur in response to waiting for release of the bus is avoided; and, retrying the address translation process in response to release of the bus by said predetermined device.

2. A microcomputer system comprising:

a memory having an address translation table;

a microprocessor device coupled to the memory by an address bus;

a memory management device coupled to said microprocessor device, wherein the memory management device comprises means for selectively assuming a bus master function, and further comprises means for selectively performing an address translation process including an access to the address translation table;

a second device coupled to said memory management device by the address bus, which second device comprises means for holding data for a data hold time which is less than a time for said memory management device to perform the address translation process and which second device includes means for selectively assuming the bus master function;

wherein said memory management device further includes:

a detection means for detection a bus request signal from the second device when the memory management device has assumed the bus master function, means for interrupting the address translation process of the memory management device in response to the detection means detecting the bus request signal from the second device and, a releasing means for releasing control of the bus from the memory management device in response to the bus request signal from the second device, whereby data that may have been lost by waiting for the execution of the address translation process is saved.

3. The microcomputer system according to claim 2, wherein:

said memory management device includes a bus control means for permitting the second device to assume the bus master function in response to the detection means detecting the bus request signal.

4. A microcomputer system according to claim 3, wherein:

said second device is a direct memory access controller, and said memory management device is a memory management unit.

5. A microcomputer system comprising:

a virtual address bus;

a physical address bus;

a microprocessor device which is coupled to the virtual address bus and which is capable of becoming a bus master;

a second device which is coupled to the physical address bus and which is capable of becoming the bus master;

a memory which is coupled to the physical address bus;

a memory management device which is coupled to the virtual address bus and to the physical address bus, which translates virtual addresses on the virtual address bus to physical addresses to be provided on the physical address bus and which is capable of becoming the bus master, the memory management device including:

a detection means for detecting a bus request signal from the second device, a process control means for interrupting a process under execution in response to the detection means detecting the bus request signal, and, a releasing means for releasing control of a bus from the memory management device in response to the detection of the bus request signal from the second device.

6. The microcomputer system according to claim 5, wherein said memory management device has a bus control means for performing a control on a basis of the detecting by said detection means so that said second device may become the bus master.

7. A microcomputer system according to claim 6, wherein:

said second device is a direct memory access controller, and said memory management device is a memory management unit.

8. A microprocessor system according to claim 6 wherein said memory management device is incorporated in the microprocessor device.

9. A memory management device which is connectable with memories via a bus in a physical address space together with a second device, wherein both are capable of becoming a bus master, the memory management device comprising:

means for detecting a bus request signal from the second device;

means for interrupting an address translation process by the memory management device including interrupting bus control by the memory management device; and, means for releasing control of the bus from the memory management device in response to detecting the bus request signal so that the second device can use the bus without waiting for a time in excess of a data hold time of the second device.

10. A microcomputer system comprising:

a virtual address bus;

a physical address bus;

a microprocessor device coupled to said virtual address bus, the microprocessor device selectively functioning as a bus master;

a second device coupled to said physical address bus, the second device having a data hold time which at least sometimes is less than a time for an execution of an address translation process, the second device selectively functioning as the bus master; and, a memory management device coupled to said virtual address bus and to said physical address bus and including means for selectively functioning as the bus master including when the address translation process is being executed by the memory management device, said memory management device including:

a detection means for detecting a bus request signal from said second device during a time when the memory management device is functioning as the bus master, means for interrupting the execution of the address translation process in response to the detection of the bus request signal, and a releasing means for releasing the memory management device from functioning as the bus master in response to the detection of the bus request signal from the second device whereby the second device is capable of becoming the bus master without waiting for the execution of the address translation process.

11. The microcomputer system according to claim 10 wherein:

said memory management device has a bus control means for releasing functioning as the bus master in response to the detection of the bus request signal by the detection means and for enabling said second device to become the bus master.

12. A microprocessor system according to claim 10 wherein:

said second device is a direct memory access controller; and, said memory management device is a memory management unit.

13. A memory management unit for use with:

a data bus;

a microprocessor, to be coupled to said data bus, including means responsive to a request for releasing use of said data bus from said microprocessor;

a predetermined device, to be coupled to said data bus, being capable of becoming bus master;

a memory, to be coupled to said data bus, including memory means for storing address translation information to be used for translating a virtual address to a physical address;

a virtual address bus, for coupling said microprocessor with said memory management unit, for transferring said virtual address; and, a physical address bus, for coupling said memory management unit with said predetermined device and with said memory, for transferring said physical address, said memory management unit comprising:

an address translation buffer for storing a translation information to be used for translating a virtual address from said microprocessor to a physical address;

an access means for accessing said memory means to introduce a predetermined translation information from said memory means to said address translation buffer via said data bus and for issuing said request to said microprocessor if said predetermined translation information is absent in said address translation buffer; and, means responsive to a bus request from said predetermined device for inhibiting said access means for said accessing said memory and for releasing use of said data bus from said memory management unit.

14. The memory management unit according to claim 13, wherein said memory means includes a converting table for storing said address translation information.

15. A microcomputer, including a microprocessor, a memory management unit and a virtual address bus for coupling said microprocessor with said memory management unit, for use with:

a data bus to be coupled to said microcomputer;

a predetermined device, to be coupled to said data bus, and being capable of becoming a bus master;

a memory, to be coupled to said data bus, and including memory means for storing address translation information to be used for translating a virtual address to a physical address; and, a physical address bus for coupling said memory management unit with said predetermined device and with said memory, said memory management unit comprising:

an address translation buffer for storing a translation information to be used for translating a virtual address on the virtual address bus to a physical address to be supplied to said physical address bus;

access means for accessing said memory means to introduce a predetermined translation information from said memory means to said address translation buffer via said data bus if said predetermined translation information is absent in said address translation buffer; and, means responsive to a bus request from said predetermined device for inhibiting said access means for accessing said memory and for releasing use of said data bus from said memory management unit.

16. The microcomputer according to claim 15, wherein said memory means includes a converting table for storing said address translation information.

17. A memory management unit for use with:

a data bus;

a microprocessor, to be coupled to said data bus, including means responsive to a request for releasing use of said data bus from said microprocessor;

a predetermined device, to be coupled to said data bus, being capable of becoming bus master;

a memory, to be coupled to said data bus, including memory means for storing address translation information to be used for translating a virtual address to a physical address, said memory management unit comprising:

an address translation buffer for storing a translation information to be used for translating a virtual address from said microprocessor to a physical address;

an access means for accessing said memory means to introduce a predetermined translation information from said memory means to said address translation buffer via said data bus and for issuing said request to said microprocessor if said predetermined translation information is absent in said address translation buffer; and, means responsive to a bus request form said predetermined device for inhibiting said access means for said accessing said memory and for releasing use of said data bus form said memory management unit.

18. The memory management unit according to claim 17, wherein said memory means is a converting table for storing said address translation information.

19. The memory management unit according to claim 18, wherein said predetermined device includes means for holding a data for a data hold time which is less than a time for the memory management unit to introduce the predetermined translation information from said memory means to said address translation buffer via said data bus.

20. A microcomputer, including a microprocessor, a memory management unit and a bus for coupling said microprocessor with said memory management unit, for use with:

a data bus to be coupled to said microcomputer;

a predetermined device, to be coupled to said data bus, and being capable of becoming a bus master; and, a memory, to be coupled to said data bus, and including memory means for storing address translation information to be used for translating a virtual address to a physical address;

said memory management unit comprising:

an address translation buffer for storing a translation information to be used for translating a virtual address to a physical address;

access means for accessing said memory means to introduce a predetermined translation information from said memory means to said address translation buffer via said data bus if said predetermined translation information is absent in said address translation buffer; and, means responsive to a bus request from said predetermined device for inhibiting said access means for accessing said memory and for releasing use of said data bus from said memory management unit.

21. The microcomputer according to claim 20, wherein said memory means is a converting table for storing said address translation information.

22. The microcomputer according to claim 21, wherein said predetermined device includes means for holding a data for a data hold time which is less than a time for the memory management unit to introduce the predetermined translation information from said memory means to said address translation buffer via said data bus.

* * * * *